United States Patent [19]
Thomas

[11] Patent Number: 5,865,579
[45] Date of Patent: Feb. 2, 1999

[54] ADAPTOR FOR PALLETIZED LOADING SYSTEM

[75] Inventor: James D. Thomas, Warren, Mich.

[73] Assignee: The United States of America as represented by the Secretary of the Army, Washington, D.C.

[21] Appl. No.: 805,192

[22] Filed: Feb. 27, 1997

[51] Int. Cl.[6] ...................................................... B60P 7/08
[52] U.S. Cl. ................................ 410/92; 410/67; 410/77; 410/81; 410/89; 193/35 R; 193/35 C; 414/536; 414/532; 296/43; 296/35.3
[58] Field of Search ................................. 410/92, 46, 66, 410/67, 81, 80, 77, 89; 193/35 R, 35 C; 244/137.1; 414/536, 532, 529; 296/43, 35.3

[56] References Cited

U.S. PATENT DOCUMENTS

| | | | |
|---|---|---|---|
| 3,163,127 | 12/1964 | Gutridge et al. | 410/81 X |
| 3,182,608 | 5/1965 | Mollon | 410/92 X |
| 3,415,480 | 12/1968 | Sertich | 410/77 |
| 3,429,536 | 2/1969 | Petry et al. | 410/77 |
| 3,899,092 | 8/1975 | Nordstrom | 414/536 X |
| 4,147,111 | 4/1979 | Weingarten | 410/92 |
| 4,395,172 | 7/1983 | Hoener et al. | 410/92 X |
| 4,807,735 | 2/1989 | Huber | 244/137.1 X |
| 4,929,133 | 5/1990 | Wiseman | 410/67 X |

Primary Examiner—Stephen T. Gordon
Attorney, Agent, or Firm—Peter A. Taucher; David L. Kuhn

[57] ABSTRACT

An adaptor is provided for a vehicle load bed having stake pockets along its lateral edges. The adaptor allows pallets having indented peripheries to roll over the bed and to be locked in place on the bed. The adaptor has a base lying on the bed and guides in the form of upright walls disposed along lateral edges of the base. The guides keep the pallet on the bed as the pallet rides along the bed. Stakes on the bottom of the base are locked into the pockets to retain the adaptor to the bed. Extending from the walls are lips disposed over the pallet so as to limit or eliminate the pallet's vertical travel. The pallets ride on elongate rollers journalled between roller supports. The supports are fixed on the base parallel to the walls. Apertures of the same shape are defined both in the lips and the base and are aligned with one another. To fix the pallets to the adaptor, locking members are passed through the lip apertures, fit with indents of the pallets and passed through the base apertures.

3 Claims, 3 Drawing Sheets

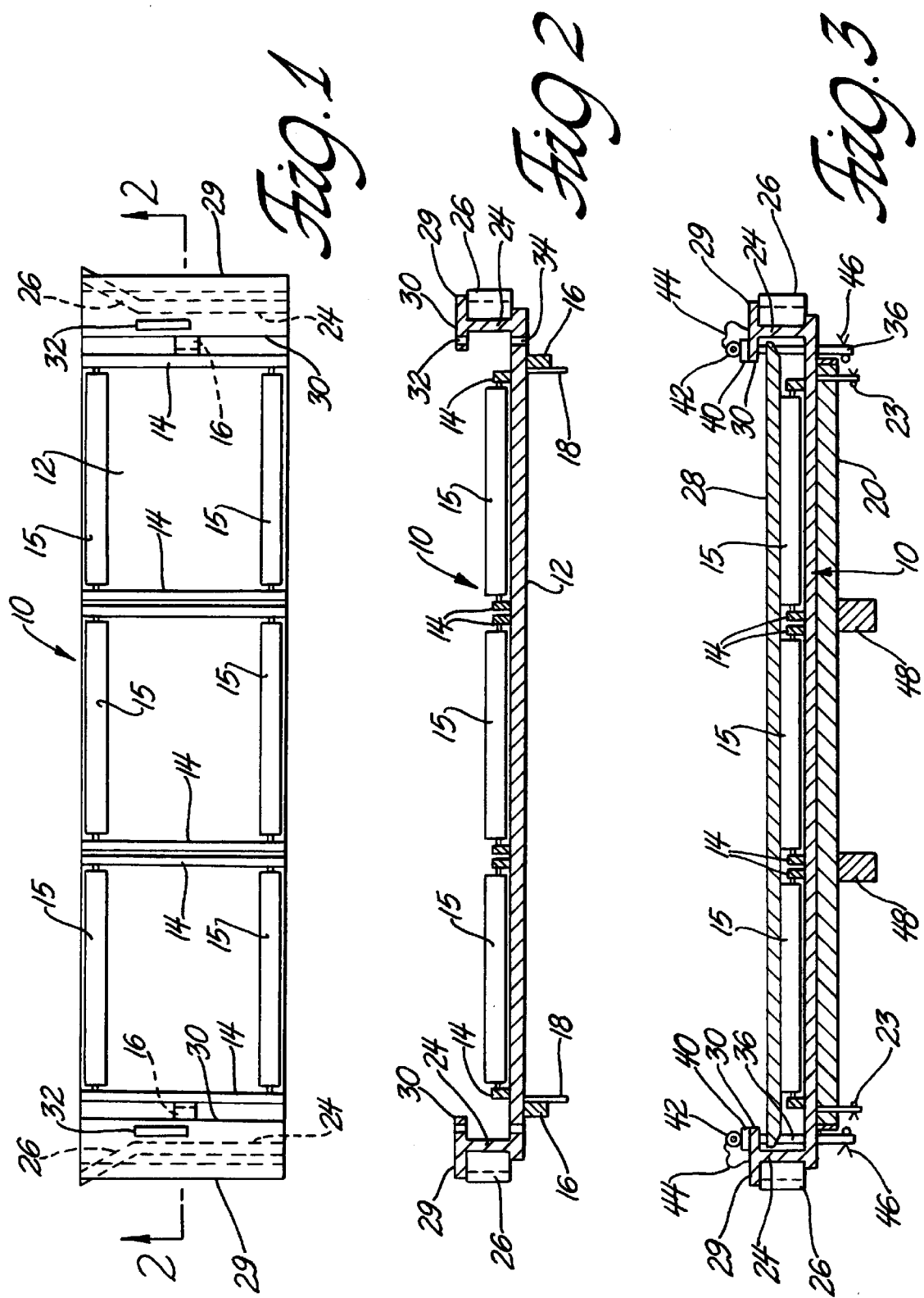

ADAPTOR FOR PALLETIZED LOADING SYSTEM

GOVERNMENT USE

The invention described here may be made, used and licensed by or for the U.S. Government for governmental purposes without paying me any royalty.

BACKGROUND AND SUMMARY OF THE INVENTION

A common problem in military logistics is cargo packaging or pallets suitable for one cargo vehicle but not suitable another cargo vehicle. In particular, the U.S. Army has problems in accepting loads on its land vehicles that are packaged for air travel.

I have invented an adaptor that addresses this problem. The adaptor fits a standard cargo bed having stake pockets disposed along lateral edges of the bed. The adaptor allows the cargo bed to hold air cargo pallets having spaced indents about their peripheries. In particular, the adaptor will allow the cargo bed of the U.S. Army's Palletized Loading System (PLS) to accept the U.S. Air Force's 463L pallets. The adaptor allows palletized loads to ride on rollers along the length of the cargo bed and guides the load in a straight path along the bed. Once the load is in a desired position, the adaptor can quickly fix the pallet relative to the cargo bed.

The adaptor has a base lying on the load bed and it has stakes that closely fit in the pockets of the bed. Guides along the adaptor's lateral edges limit sideways slip of the pallet as the pallet rides along the bed. Extending inward of the adaptor from the guides are lips which limit vertical travel of the pallet. The pallet rides on a set of rollers journalled to roller supports, which are generally parallel to the guides. The lips and base define similarly shaped apertures that are aligned with one another. When locking members pass through the lip and base apertures, they also fit indents on the pallets. Consequently, the pallets are prevented from riding further over the load bed.

BRIEF DESCRIPTION OF THE DRAWINGS

FIG. 1 is a plan view of the adaptor.

FIG. 2 is a sectional view taken along line 2—2 in FIG. 1.

FIG. 3 is a sectional view of the adaptor resting on a load bed and having a pallet thereon.

DETAILED DESCRIPTION

Figure 4:
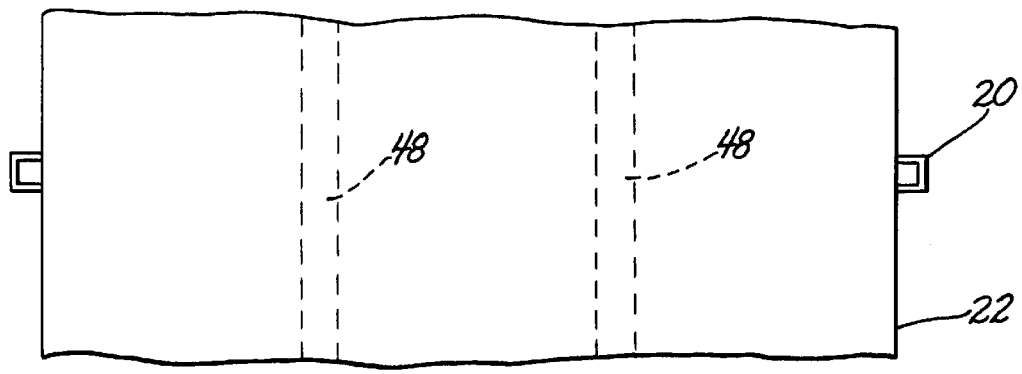
FIG. 4 is a partial plan view of a typical load bed for a cargo vehicle.

In FIGS. 1 and 2 are shown a generally elongate palletized load adaptor 10 having a flat, thin base or sheet 12 upon which are fixed a set of roller supports 14. Normally, supports 14 are bars or beams oriented longitudinally of an elongate cargo bed on which adapter 10 is placed. Journalled in the roller supports are cylindrical rollers 15, the upper parts of which are higher than the supports. The rollers and supports add stiffness to base 12. Fixed to the underside of base 12 are stub stakes 16 having stake extensions 18. The stakes and their extensions fit closely in open bottomed pockets 20 (FIG. 4) of the load bed 22 of a trailer or cargo vehicle (not shown). Cotter pins 23 or like retainers in extensions 18 prevent stakes 16 from escaping pocket 20.

Figure 6:
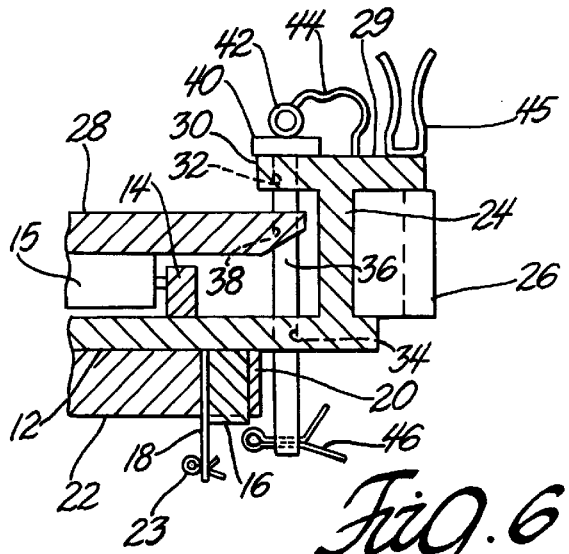
FIG. 6 is an enlarged view of portions of the adaptor, bed and pallet shown in FIG. 3.
Figure 7:
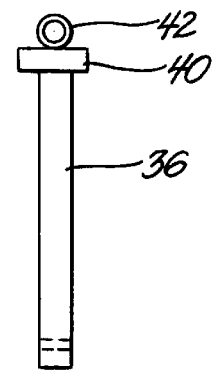
FIG. 7 is a front elevational view of a locking member that holds a pallet in place on the adaptor.
Figure 8:
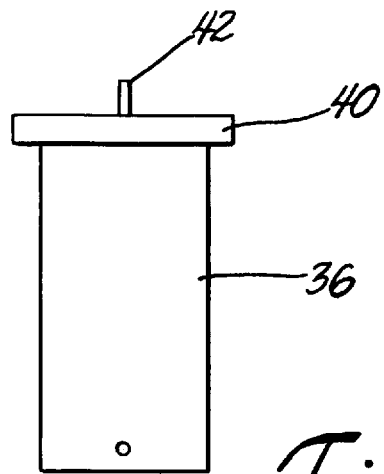
FIG. 8 is a side elevational view of the locking member.

Referring now to FIGS. 1, 2 and 6, at either end of base 12 is an upright wall or end guide 24 that has a dog leg 26. Guides 24 laterally retain a pallet 28 (FIG. 3) on adaptor 10 as the pallet rides on rollers 15. Dog legs 26 define flared openings to facilitate the pallet's entry between the walls. Atop guides 24 are caps 29 whose inner lips 30 extend inwardly of the adaptor from walls 24. As seen in FIG. 3, inner lips 30 hang over the edges of pallet 28, so that upward vertical movement of pallet 28 is limited. The distance between pallet 28 and the undersides of lips 30 can be negligible or naught, so that little or no upward movement of the pallet can occur. Elongate rectangular apertures 32 are defined by lips 30, and apertures 32 align with similarly shaped apertures 34 in base 12.

Figure 5:
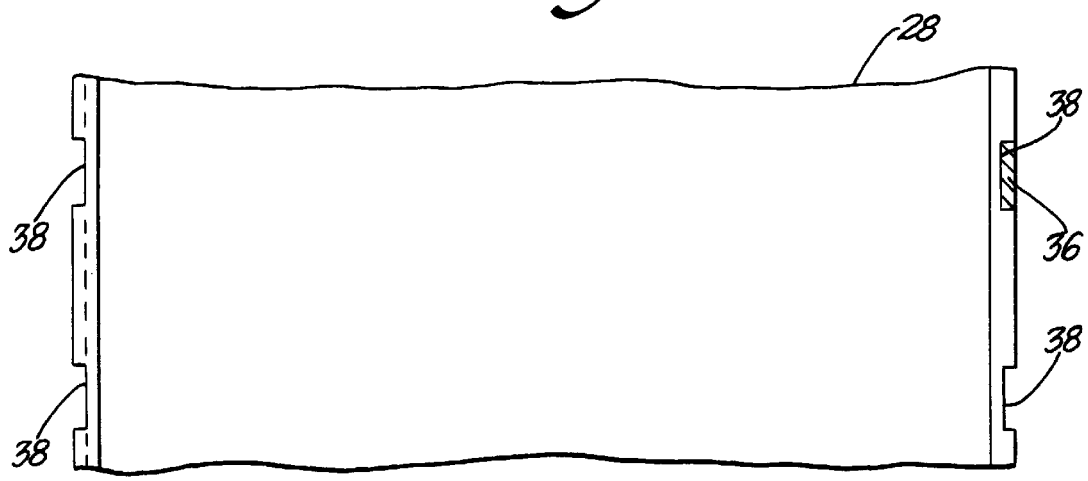
FIG. 5 is a partial plan view of a pallet having indents formed in its sides.

Pallet locking pins or members 36 pass closely through apertures 32 and 34 and also fit closely with indents 38 of pallet 28. FIG. 5 shows a cross section of a locking member 36 fit with one of the indents 38 of pallet 28. When members 36 so engage the apertures and indents at both sides of pallet 28, they keep pallet 28 from riding on rollers 15. Members 36 are held on adapter 10 by cotter pins 46 or other conventional retainers passing through the bottom of locking member 36. Members 36 also have flat heads 40 larger than apertures 32. Optionally, a clip 45 (FIG. 6 only) or the like fastened atop cap 29 can retain locking member 36 when it is removed from apertures 32 and 34. Also connecting members 36 to adaptor 10 are lines 44 between caps 29 and eyes 42 on heads 40.

Figure 9:
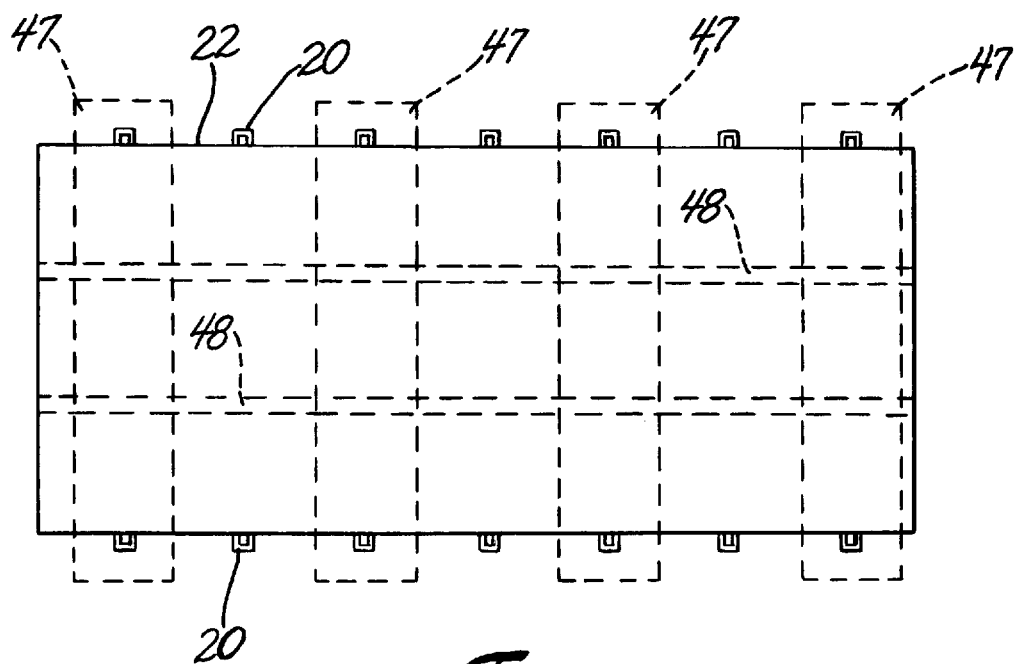
FIG. 9 is a plan view of a vehicle load bed showing various positions where the adaptor can be located thereon.

In FIG. 9 possible positions of adaptor 10 on load bed 22 are shown by dashed rectangles 47. An adapter can be placed across load bed 22 at any position where stake pockets 20 are disposed along the lateral sides of bed 22. The use of several adapters on bed can create a continuous roll path on the bed. As can be seen from FIG. 3, base 12 lies flat upon bed 22 and need not be structurally robust to accommodate the weight of cargo loads. Consequently, base 12 can be of relatively light construction so that loading dock personnel can lift it more easily. Optionally, it may be preferred that the more inboard roller supports 14 will lie directly above longitudinal frame members 48 of the load bed.

I wish it understood that I do not desire to be limited to the exact details of construction or method shown herein since obvious modifications will occur to those skilled in the relevant arts without departing from the spirit and scope of the following claims.

What is claimed is:

1. For a load bed of a vehicle, an adaptor allowing pallets to ride over the bed and to be locked in place on the bed, the adaptor comprising:

a base comprising a flat sheet lying facially upon the bed;

means on the base for attaching the base to the bed;

guides disposed along lateral edges of the base;

lips of the guides extending inwardly of the adaptor, the lips defining apertures therein;

elongate roller supports parallel to the lips;

cylindrical rollers journalled between the supports;

base apertures defined in the base, the base apertures being the same shape as and being aligned with the lip apertures;

locking members passed through the lip apertures and the base apertures; and means for keeping the locking members engaged with the lips and the base.

2. For a vehicle load bed having stake pockets along its lateral edges, an adaptor allowing pallets to ride over the bed and to be locked in place on the bed, wherein the pallets define indents on their sides, the adaptor comprising:

a base sheet lying upon the bed in facial contact therewith;

stakes on the bottom of the base sheet fitting through the pockets;

guides disposed along lateral edges of the adaptor, the guides comprising upright walls;

lips of the guides extending inwardly of the adaptor from the walls;

roller supports parallel to the upright walls;

rollers journalled between the supports;

lip apertures defined in the lips;

base apertures defined in the base sheet, the base apertures being aligned with the lip apertures;

locking members passed through the lip apertures, fitting selected ones of the indents and passing through the base apertures; and means for keeping the locking members engaged with the lips and the base sheet.

3. For a vehicle load bed having stake pockets along its lateral edges, an adaptor allowing pallets to roll over the bed and to be locked in place on the bed, wherein the pallets define indents about their peripheries, the adaptor comprising:

a base lying upon the bed;

stakes on the bottom of the base fitting the pockets;

guides disposed along lateral edges of the adaptor, the guides comprising upright walls;

means for limiting vertical travel of a pallet, the limiting means comprising lips of the guides extending inwardly of the adaptor from the walls;

roller supports on the base parallel to the upright walls;

elongate rollers journalled between the supports;

lip apertures defined in the lips;

base apertures defined in the base, the base apertures being aligned with the lip apertures;

locking members passed through the lip apertures, fitting selected ones of the indents and passing through the base apertures; and means for keeping the locking members engaged with the lips and the base.

* * * * *